US008738882B2

(12) United States Patent
Post et al.

(10) Patent No.: US 8,738,882 B2
(45) Date of Patent: May 27, 2014

(54) PRE-ORGANIZATION OF DATA

(75) Inventors: Daniel Jeffrey Post, Campbell, CA (US); Erik C. Neuenschwander, San Mateo, CA (US); Daniel E. Crosby, San Francisco, CA (US); Ken Herman, San Jose, CA (US); David Michael Chan, Palo Alto, CA (US); Benjamin H. Nham, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 13/153,330

(22) Filed: Jun. 3, 2011

(65) Prior Publication Data

US 2012/0311000 A1   Dec. 6, 2012

(51) Int. Cl.
*G06F 13/00*   (2006.01)
*G06F 12/02*   (2006.01)

(52) U.S. Cl.
CPC ........ *G06F 12/02* (2013.01); *G06F 2212/7205* (2013.01); *G06F 12/0246* (2013.01)
USPC .......................................... 711/170; 711/101

(58) Field of Classification Search
USPC .................................................. 711/E12.001
See application file for complete search history.

(56) References Cited

U.S. PATENT DOCUMENTS

| 5,933,847 | A | 8/1999 | Ogawa |
| 7,590,664 | B2 * | 9/2009 | Kamohara et al. .................... 1/1 |
| 8,122,220 | B1 * | 2/2012 | Montierth et al. ............ 711/173 |
| 8,144,515 | B2 * | 3/2012 | Moshayedi .............. 365/185.11 |
| 2006/0168392 | A1 | 7/2006 | Hwang |
| 2008/0235304 | A1 * | 9/2008 | Fujii et al. ..................... 707/205 |
| 2009/0225606 | A1 | 9/2009 | Eggleston et al. |
| 2010/0064111 | A1 | 3/2010 | Kunimatsu et al. |
| 2010/0287353 | A1 | 11/2010 | Khmelnitsky et al. |
| 2010/0287446 | A1 | 11/2010 | Post et al. |
| 2011/0019482 | A1 * | 1/2011 | Van Buskirk et al. ... 365/185.18 |
| 2011/0066789 | A1 | 3/2011 | Wakrat et al. |
| 2011/0072189 | A1 * | 3/2011 | Post et al. ..................... 711/103 |

FOREIGN PATENT DOCUMENTS

WO        2011/011480 A1    1/2011

OTHER PUBLICATIONS

Li-Pin Chang, On Efficient Wear Leveling for Large-Scale Flash-Memory Storage Systems, Department of Computer Science, National Chiao-Tung University, Hsin-chu, Taiwan, SAC '07 Mar. 11-15, 2007, Seoul, Korea.

* cited by examiner

*Primary Examiner* — Sangwoo Ahn
(74) *Attorney, Agent, or Firm* — Womble Carlyle Sandridge & Rice LLP

(57) ABSTRACT

In a method of writing data to a file system on a solid state drive, a file stream is opened for writing to a file in the file system. A life expectancy value predicting a length of time the data to be written will be stored in the file system is attached to the file stream. The data is written to the file stream and stored on the solid state storage device according to the life expectancy value attached to the data. In one embodiment, a unique identifier may be used as the life expectancy value for writing a group of related files predicted to be stored in the file system for substantially the same length of time. The life expectancy value may be predicted based on a file type of the file being written. The life expectancy value may be stored as metadata for the file being written.

20 Claims, 2 Drawing Sheets

PRE-ORGANIZATION OF DATA

BACKGROUND

1. Field

Embodiments of the invention relate to the field of managing the storage of files on a media in a computer system; and more specifically, to the managing the storage of files on a non-volatile solid-state memory storage device.

2. Background

Processor based devices such as general purpose computers, personal digital assistants, wireless communications devices, personal media players, and the like generally require some form of non-volatile storage to store significant amounts of data for extended periods of time without requiring power. Historically, rotating magnetic storage, such as a disk drive, has been a common choice to provide non-volatile storage because of its relatively low cost and compact size.

More recently solid state memories, such as NAND flash memory, have become a viable alternative to disc drives to provide non-volatile storage for processor based devices. Solid state memories are generally packaged as a solid state drive (SSD) for use as an alternative to a disk drive. An SSD typically uses the same interface as a disk drive and is arranged to operate in the same manner as a disk drive so that an SSD may be used interchangeably with a disk drive. This allows an SSD to be used in a processor based device with little, if any, change to the software that runs on the device.

While an SSD can be made to look outwardly like a disk drive, the solid state memories that provide the persistent storage of the SSD have some characteristics that differ markedly from the characteristics of magnetically recorded data. Flash memory, and particularly NAND flash memory, is a popular choice for solid state memory in an SSD. Among the differences between NAND flash memory and magnetic media is that flash memory cannot be erased in small units, such as bytes, but only in large blocks. SSDs typically provide "garbage collection" that finds blocks where a significant portion of the block has been deleted, moves any remaining active data to a new block, and erases the block, freeing it for future writes. This generally means that data written to an SSD will be written to memory in the drive more than once over its lifetime. This and other operations that maintain the SSD result in more writes being performed by the SSD than were requested by the host device, a phenomenon known as "write amplification."

Another limitation of flash memory is that it provides only a finite number of program-erase cycles before the integrity of the storage deteriorates. While the number of program-erase cycles provided by flash memories is increasing, currently many devices provide about 100,000 cycles. SSDs typically provide "wear leveling" which attempts to write data in a such a way that the number of program-erase cycles for the blocks is reasonably uniform for the entire drive.

Considerations such as the above and performance considerations force a trade-off in the block size of the memory used in an SSD. Smaller block sizes make erasure, garbage collection, and wear leveling more efficient and reduce write amplification. On the other hand, large block sizes, which may be implemented by data striping a block across multiple memory devices, increase read/write speeds of the SSD.

An SSD may attempt to separate static and dynamic data to reduce write amplification. When static data, which rarely changes, is written to the same block as dynamic data, which frequently changes, the static data will have to be rewritten because the dynamic data will cause a portion of the block to be deleted, and eventually garbage collected. However, it is difficult for an SSD to determine what data is static and what is dynamic. Such a process requires maintaining historical data to identify static data. Static data is likely to be rewritten several times before it is identified as static. Further, even data that is identified as static will probably be deleted at some point in time. Deleting static data therefore can still cause a portion of the block to be deleted, and eventually garbage collected although more slowly than if dynamic data is intermingled with static data.

It would be desirable to provide a mechanism that allows an SSD to more effectively separate static and dynamic data.

SUMMARY

In a method of writing data to a file system on a solid state drive, a file stream is opened for writing to a file in the file system. A life expectancy value predicting a length of time the data to be written will be stored in the file system is attached to the file stream. The data is written to the file stream and stored on the solid state storage device according to the life expectancy value attached to the data. In one embodiment, a unique identifier may be used as the life expectancy value for writing a group of related files predicted to be stored in the file system for substantially the same length of time. The life expectancy value may be predicted based on a file type of the file being written. The life expectancy value may be stored as metadata for the file being written.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
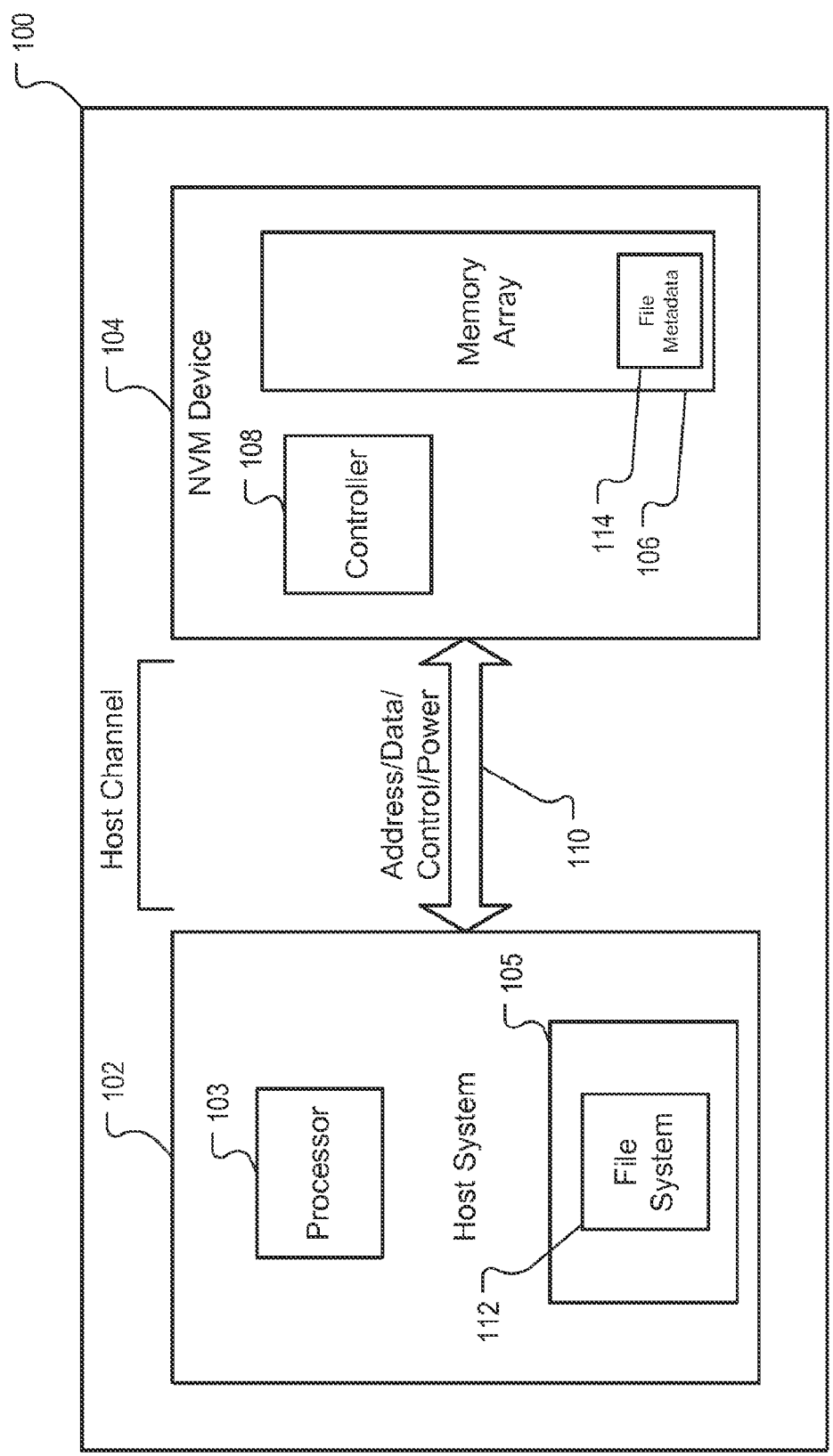
FIG. 1 is a block diagram of an exemplary processor based device that includes the invention.
Figure 2:
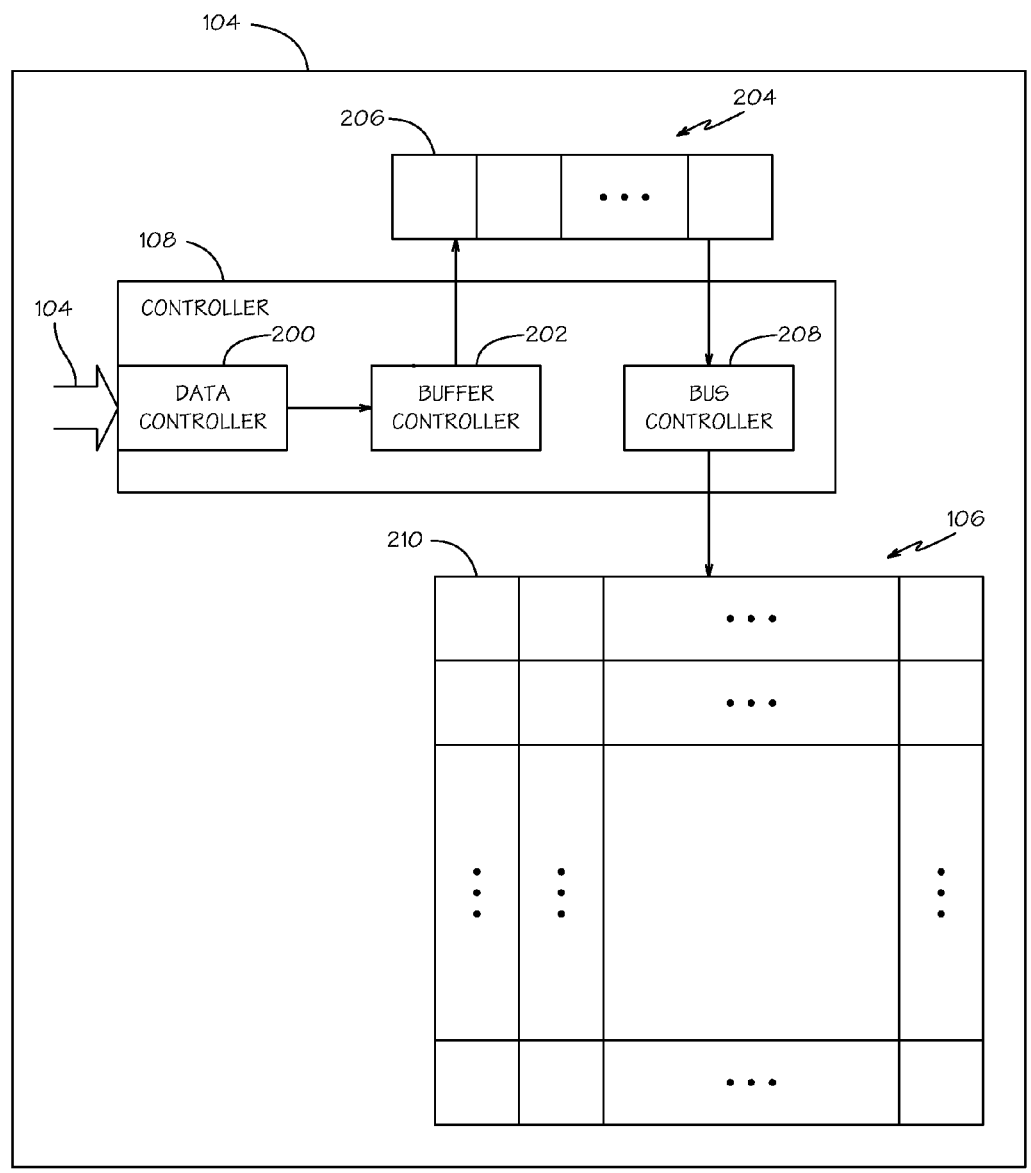
FIG. 2 is a block diagram of an exemplary non-volatile memory (NVM) that includes the invention.

FIG. 1 shows an exemplary processor based device 100 that includes the invention. The device 100 includes a host system 102 coupled to an non-volatile memory (NVM) 104 (e.g., a NAND flash memory device) by way of a host channel 110. The NVM device 104 can be a raw memory device (e.g., raw NAND device), or a BGA package or other IC package, including multiple NVM devices (e.g., multiple raw NAND dies). The memory system 100 can be used in a variety of devices, including but not limited to: handheld computers, mobile phones, digital cameras, portable music players, toys, thumb drives, email devices, and any other devices in which non-volatile memory is desired or required.

In some implementations, the host system 102 can include a processor 103, memory 105 (e.g., RAM) and various other structures (e.g., an interface for communicating over host channel 110). The memory 105 can include instructions which when executed by the processor 103 implements an operating system, including a file system 112. The operating system provides access to the device hardware for other programs being executed by the processor 103.

The file system 112 is a data structure implemented by the operating system to organize data stored in NVM into files that are accessible by name, hiding the actual device storage organization from programs that read and write data in the file system. The file system 112 can include file system metadata 114, including but not limited to unique object identifiers (IDs) for identifying files in the file system 112. The operating system performs operations for writing data to a file system in the NVM.

In some implementations, the NVM device 104 includes a controller 106 that is operable for accessing and managing the NVM device 104 over the host channel 110. In some implementations, the controller 106 can perform memory management functions (e.g., wear leveling, garbage collection) and can include an error correction (ECC) engine for detecting and correcting data errors (e.g., flipped bits).

In some implementations, the host system 102 and NVM device 104 can communicate information (e.g., control commands, addresses, data) over the host channel 110. The host channel 110 can support standard interfaces, such as raw NAND interfaces or dual channel interfaces, such as is described in ONFI specification version 2.0.

A program that wishes to write data to the NVM 104 instructs the operating system to open a file stream for writing to a file in the file system. The file stream may be identified by name. An exemplary instruction that may be used to open a file stream for writing is fopen("filename", "w"). Opening the file stream may return a file pointer (fp) that can be used in subsequent file operations, such as writing data to the file stream, to direct the file operations to the opened file. When all file operations have been completed the program instructs the operating system to close the file stream, such as by issuing an fclose(fp). Closing the file stream causes the operating system to perform operations need to complete the previously performed file operations. For example, writes to the file system may be buffered at various levels; upon close these buffers are transferred to the NVM to be written for persistent storage.

According to the present invention, a life expectancy value is attached to the file stream. The life expectancy value is a prediction of a length of time the data to be written will be stored in the file system. The life expectancy value may be attached to the file stream using a command such as fcntl(fp, Life_Expectancy). (In some implementations fcntl uses a file descriptor rather than a file pointer and the command could be fcntl(fileno(fp), Life_Expectancy).) The life expectancy value is used by the NVM to select blocks where the data will be stored when the NVM uses persistent memory that can only be erased in large blocks. By using the life expectancy value to select blocks, the NVM is able to do an initial write of the data that reduces the likelihood that persistent data, which may be unchanged for a length of time ranging from days to years, will share a block with volatile data that may be deleted within a matter of hours or even minutes. Blocks that contain only persistent data remain fully valid and thus do not have to be "garbage collected," erased, and rewritten to recover space occupied by deleted files within the block.

In some implementations, the life expectancy value is a binary value. For example, the life expectancy value may be labeled Persistent and have a value of true or false. A Persistent life expectancy value may default to false so that data is considered volatile unless specifically identified as persistent. In other implementations, the life expectancy value is multi-valued such as volatile, short, medium, long to allow a more nuanced prediction of data life expectancy. In still other implementations, the life expectancy value may be a value that can take on a large number of values representing a continuum of predictions from highly volatile to extremely persistent.

There are situations where a number of related files having substantially the same life expectancy are written to the file system. For example, a program may consist of a large number of files that will all persist for as long as the program is installed on the host device. In some cases these may be a large number of small files that are smaller than the block size of the NVM. Even if the life expectancy cannot be predicted in terms of a length of time, it is useful to identify that the files have the same life expectancy. If the related files are stored in the same blocks, those block will likely remain completely valid or be completely deleted at about the same time.

In some implementations, the operating system may provide a function that issues a unique identifier (ID) that can be used as the life expectancy value for related files that are predicted to be stored in the file system for substantially the same length of time. The unique identifier is obtained prior to writing the first file and is then used as the life expectancy value attached to each file stream used to write data for each of the files in the group of related files.

In some implementations, the operating system may predict the life expectancy value based on a file type of the file being written. Files may be identified by an extension of the file name which may, by convention, indicate the type of data contained in the file. For example, a file extension of "jpg" indicates that the file contains photographic image data. The operating system may predict that such data will be persistent because most users store photographic images for extended periods of time. As another example, a file extension of "xls" indicates that the file contains spreadsheet data. The operating system may predict that such data will be volatile because users typically update values within a spreadsheet and because programs that manipulate spreadsheet data write the data frequently to track the updates. The operating system may predict the life expectancy value only if the application writing the file doesn't provide a life expectancy value.

In some implementations, the operating system may store the life expectancy value as metadata for the file being written. The life expectancy value may be stored with other values related to the file such as name, path, timestamps, etc. In some implementations, the life expectancy may be stored at the file level. In other implementations, the life expectancy may be stored at the block level, i.e. along with other metadata for the logical block (well below the file system layer). The stored life expectancy value may be used by the NVM to make decisions about the relocation of the data after the initial write. For example, the NVM may wish to relocate persistent data in blocks that have low numbers of write cycles to blocks that have high numbers of write cycles as part of a wear leveling process.

The NVM is an electronic device 104 that includes a non-volatile memory 106 organized into erasable blocks 210. In some implementations, the non-volatile memory 106 is flash memory, such as NAND type flash memory. The erasable blocks 210 are typical larger than writable units of the file system 112 provided by the host system 102. For example, data may be writable in four kilobyte pages while data is erased in 256 kilobytes blocks (64 writable pages). As pages are deleted from a block, an increasing amount of the NVM capacity becomes unusable. Eventually, a block with a significant number of deleted pages is garbage collected by writing the remaining active pages in a clean block and erasing the block to make the NVM capacity used by the deleted pages usable.

An NVM that embodies the invention may include one or more buffers 204 coupled to the non-volatile memory 106. Each buffer 206 may be sized to hold some or all of the data to be written to an erasable block 210 of the non-volatile memory 106.

A device controller 108 is coupled to the non-volatile memory 106, the plurality of buffers 204 if present, and a data bus 110. The device controller includes a data controller 200 for communicating with a source of data through the data bus 110, a buffer controller 202 for communicating with the plurality of buffers 204 if present, and a bus controller 208 for communicating with the non-volatile memory 106.

The control circuitry of the controller 108 performs the operations that implement the functions of the NVM 104. The control circuitry 108 directs the data controller 200 to receive data to be initially written to the non-volatile memory and to receive an associated life expectancy value. The term "initially written" is used to mean data being written to the NVM 104 for the first time as opposed to data that may be written to the NVM when the controller 108 performs maintenance functions, such as garbage collection or wear leveling, that cause data already written to the NVM to be written again.

In implementations that include buffers, the control circuitry 108 selects a buffer 206 to receive the data according to the associated life expectancy value. In some implementations, the control circuitry 108 uses each of the plurality of buffers 204 to receive data designated with a particular life expectancy value, or range of life expectancy values. For example, in one implementation, the control circuitry 108 selects one of two buffers, with one buffer receiving persistent data and the other receiving volatile data according to a binary value for life expectancy. In other implementations there is a single buffer and the buffered data is flushed from the buffer to the erasable block selected to receive data with the life expectancy of the buffered data before data with a different life expectancy is written to the buffer. When a buffer is filled, or at such other times as necessary to ensure data integrity, the control circuitry 108 directs the bus controller 208 to write the contents of the buffer 204 to the erasable block 210 of the non-volatile memory 106 selected to receive data with the life expectancy of the buffered data.

In implementations that do not include buffers, the control circuitry 108 selects an erasable block 210 of the non-volatile memory 106 according to the life expectancy of the received data and directs the bus controller to write the received data to the selected erasable block.

In some implementations, the control circuitry 108 stores the life expectancy value as metadata 114 for the data being written.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A method for writing files to a file system in a non-volatile memory, the method comprising:
    opening a file stream for writing a first file to the file system;
    predicting a life expectancy value of the first file, wherein the life expectancy value is a prediction of a length of time the first file will remain stored in the file system;
    attaching the life expectancy value to the file stream;
    writing the first file to the file stream to cause the first file to be written to the non-volatile memory according to the life expectancy value attached to the file stream; and
    identifying a second file having a similar life expectancy to the first file, wherein writing the first file to the file stream includes writing the first file to a buffer associated with an erasable block that is larger than each of the first file and the second file.

2. The method of claim 1, wherein the life expectancy value is a binary value.

3. The method of claim 1, wherein the life expectancy value is predicted based on a file type of the first file.

4. The method of claim 1, wherein the life expectancy value is stored as metadata for the first file.

5. The method of claim 1, wherein the non-volatile memory is a flash memory.

6. A processor-based device, comprising:
    a processor;
    a non-volatile memory coupled to the processor; and
    an operating system that is executed by the processor, the operating system performing operations for writing data to a file system in the non-volatile memory, the operations including:
        opening a file stream for writing a file to the file system,
        predicting a life expectancy value of the file, wherein the life expectancy value is a prediction of a length of time the file will remain stored in the file system,
        attaching the life expectancy value to the file stream, and
        writing the file to the file stream to cause the file to be stored in the non-volatile memory according to the life expectancy of the data, wherein the non-volatile memory:
    includes an erasable block that is larger than each file in a plurality of files having a similar life expectancy to the file, and
    is coupled to a buffer that is associated with the erasable block, wherein writing the file to the file stream comprises writing the file to the buffer.

7. The processor-based device of claim 6, wherein the life expectancy value is a binary value.

8. The processor-based device of claim 6, wherein the operating system predicts the life expectancy value based on a file type of the file.

9. The processor-based device of claim 6, wherein the operating system stores the life expectancy value as metadata for the file.

10. The processor-based device of claim 6, wherein the non-volatile memory is a flash memory.

11. A device controller for accessing a non-volatile memory organized into a plurality of erasable blocks, the device controller comprising:
    a data controller for communicating with a source of data;
    a bus controller for communicating with the non-volatile memory and the source of data;
    control circuitry configured to perform operations that include:
        directing the data controller to receive data to be initially written to the non-volatile memory and to receive a life expectancy value that is associated with the data, wherein the associated life expectancy value is predicted by an operating system and represents a predicted length of time the data will remain stored in a file system, selecting one of the plurality of erasable blocks to receive the data according to the associated life expectancy value, and directing the bus controller to write the data to the selected erasable block of the non-volatile memory, wherein a buffer is associated with the plurality of erasable blocks, each erasable block in the plurality of erasable blocks is larger than each file in a plurality of files having a similar life expectancy to the data, and writing the data to the selected erasable block comprises writing the data to the buffer.

12. The device controller of claim 11, wherein the control circuitry is further configured to select the buffer to receive the data according to the associated life expectancy value.

13. The device controller of claim 11, wherein the life expectancy value is a binary value and the device controller selects one of two erasable blocks.

14. The device controller of claim 11, wherein the control circuitry is further configured to store the life expectancy value as metadata for the data being written.

15. The device controller of claim 11, wherein the non-volatile memory comprises flash memory.

16. An electronic device comprising:
a non-volatile memory organized into a plurality of erasable blocks; and
a device controller coupled to the non-volatile memory and a data bus, the device controller performing operations including:

receiving data to be initially written to the non-volatile memory and a life expectancy value that is associated with the data, wherein the life expectancy value is predicted by an operating system and represents a predicted length of time the data will remain stored in a file system, selecting one of the plurality of erasable blocks to receive the data according to the associated life expectancy value, and writing the received data to the selected erasable block, wherein each of the plurality of erasable blocks is larger than a portion of data associated with the life expectancy, and writing the data to the file stream comprises writing the data to a buffer that is associated with the selected erasable block.

17. The electronic device of claim 16, wherein the device controller is further configured to select the buffer to receive the data according to the associated life expectancy value.

18. The electronic device of claim 16, wherein the life expectancy value is a binary value and the device controller selects one of two buffers.

19. The electronic device of claim 16, wherein the device controller is further configured to store the life expectancy value as metadata for the data being written.

20. The electronic device of claim 16, wherein the non-volatile memory is a flash memory.

* * * * *